(12) United States Patent
Chen (10) Patent No.: US 10,122,181 B2
(45) Date of Patent: Nov. 6, 2018

(54) SYSTEM FOR LOCAL DC POWER DISTRIBUTION

(71) Applicant: Kong-Chen Chen, Gilroy, CA (US)

(72) Inventor: Kong-Chen Chen, Gilroy, CA (US)

( * ) Notice: Subject to any disclaimer, the term of this patent is extended or adjusted under 35 U.S.C. 154(b) by 201 days.

(21) Appl. No.: 15/389,187

(22) Filed: Dec. 22, 2016

(65) Prior Publication Data

US 2017/0229875 A1 Aug. 10, 2017

Related U.S. Application Data

(60) Provisional application No. 62/293,663, filed on Feb. 10, 2016.

(51) Int. Cl.
*H02J 5/00* (2016.01)
*H02J 3/00* (2006.01)

(52) U.S. Cl.
CPC ..................................... *H02J 5/00* (2013.01)

(58) Field of Classification Search
CPC ......................................................... H02J 5/00
USPC ............................................................. 307/82
See application file for complete search history.

(56) References Cited

U.S. PATENT DOCUMENTS

| 5,477,091 A * | 12/1995 | Fiorina | H02J 1/14 307/66 |
| 2007/0279166 A1* | 12/2007 | VanderVeen | H01H 71/08 335/202 |
| 2011/0235243 A1* | 9/2011 | Rus | H01H 9/042 361/624 |
| 2012/0043105 A1* | 2/2012 | Baird | H01H 9/04 174/50.5 |

OTHER PUBLICATIONS

ABB, "ABB circuit-breakers for direct current applications," *5QT Technical Application Papers*, Sep. 2007, ABB.
Square D by Schneider Electric, "NQ Circuit Breaker Panelboards," *Catalog 1640CT0801 2008 Class 1640*, Dec. 2008, Square D by Schneider Electric.
Larsen, "Backfeeding Ground Fault Circuit Breakers," *Electrical Shortz*, Jun. 2010, Document No. 0900DB1001 R02/12, Square D by Schneider Electric.

* cited by examiner

*Primary Examiner* — Hal Kaplan
(74) *Attorney, Agent, or Firm* — Alston & Bird LLP (57) ABSTRACT

An electrical apparatus for delivering DC power to an existing outlet in a building is presented. The electrical apparatus includes a first circuit breaker configured to convert an AC voltage provided from an AC power source to a DC voltage, replace a second circuit breaker already disposed in a service panel of the building with the first circuit breaker, and deliver DC power to the existing outlet, when the first circuit breaker is installed at the service panel.

36 Claims, 3 Drawing Sheets

SYSTEM FOR LOCAL DC POWER DISTRIBUTION

CROSS-REFERENCES TO RELATED APPLICATIONS

This application claims priority, under 35 U.S.C. § 119(e), from U.S. Provisional Application No. 62,293,663, filed on Feb. 10, 2016, entitled "Apparatus and Method for Local DC Power Distribution," the contents of all of which is incorporated herein by reference in its entirety.

BACKGROUND

The present invention relates to electrical power distribution, and more particularly, to locally distributing direct current (DC) power.

The evolution of digital electronics brings more miniature and low power electronic devices, such as tablets, cellular phones, and/or digital cameras, to daily use. Most of these miniature and low power electronic devices, hereinafter also referred to as "DC devices," use DC power for their internal components, such as integrated circuits (IC), to operate. DC devices need external power adaptors, such as a cellular phone charger, to convert 120V or 240V alternating current (AC) power to 5V DC power, in order to charge and/or power the DC devices from the AC power distribution system in the building. As the number of different miniature and low power electronic devices increase, the more the number of different power adaptors are needed.

Each generation of DC device often provide their own different companion power adaptor. One drawback with the use of power adaptors is that old power adaptors used by older generation devices are frequently discarded when newer generation devices are brought into use, which generates considerable electronic waste. Further, the power conversion efficiency of power adaptors may be low for low cost DC devices and leads to wasted energy.

Accordingly, there is a need to reduce the use of AC to DC power adapters for DC devices to reduce electronic waste and wasted energy.

SUMMARY

According to one embodiment of the present invention, a method to deliver DC power to one of a multitude of existing AC power distribution circuits in a building is presented. A first one of the multitude of existing AC power distribution circuits includes a first AC hot wire and a first socket. A second one of the multitude of existing AC power distribution circuits includes a second AC hot wire and a second socket. The first AC hot wire is connected between the first socket and a first circuit breaker. The second AC hot wire is connected between the second socket and a second circuit breaker. The first AC hot wire is connected through the first circuit breaker to a first common AC line wire. The second AC hot wire is connected through the second circuit breaker to a second common AC line wire. The first common AC line wire and the second common AC line wire are coupled to an AC power source that supplies AC power to the building. The first common AC line wire, the second common AC line wire, the first circuit breaker, and the second circuit breaker are dispositioned at a service panel in the building. The method includes forming a first circuit by integrating and connecting a third circuit breaker in series with a converter circuit. The converter circuit converts AC power to DC power. The method further includes replacing the first circuit breaker with the first circuit, electrically connecting the first circuit between the first common AC line wire and the first AC hot wire at the service panel, and converting AC power provided from the first common AC line wire to DC power using the converter circuit. The method includes delivering DC power from the first circuit to the first AC hot wire and the first socket of the first one of the multitude of existing AC power distribution circuits while keeping AC power delivery unchanged to the second one of the multitude of existing AC power distribution circuits.

According to one embodiment, the first common AC line wire is the same as the second common AC line wire. According to one embodiment, the AC power source supplies AC power to the service panel and the building. According to one embodiment, the service panel is operative to disconnect the AC power source from the building. According to one embodiment, the first socket is disposed on the surface of a wall of the building. According to one embodiment, the steps of replacing the first circuit breaker, electrically connecting the first circuit, converting AC power, and delivering DC power are performed at the service panel of the building.

According to one embodiment, the method further includes receiving AC power from the first common AC line wire and a common neutral wire. The common neutral wire is coupled to the AC power source. The common neutral wire is dispositioned at the service panel. According to one embodiment, the method further includes replacing the first circuit with the first circuit breaker after replacing the first circuit breaker with the first circuit and then delivering AC power from the first common AC line wire to the first AC hot wire and the first socket.

According to one embodiment, the method further includes connecting the third circuit breaker between the first common AC line wire and the converter circuit and automatically disconnecting the converter circuit from the first common AC line wire when the amount of current flowing through the third circuit breaker exceeds a predetermined current. The method further includes preventing damage to the first circuit and the first one of the multitude of existing AC power distribution circuits when the converter circuit is disconnected from the first common AC line wire. According to one embodiment, the method further includes reconnecting the converter circuit to the first common AC line wire using the third circuit breaker when the amount of current flowing is safe for reconnection.

According to one embodiment, the first one of the multitude of existing AC power distribution circuits further includes a first AC neutral wire. The first AC neutral wire is connected between the first socket and a common neutral wire dispositioned at the service panel. The method further includes disconnecting the first AC neutral wire from the common neutral wire at the service panel when the first circuit replaces the first circuit breaker at the service panel.

According to one embodiment, the method further includes electrically connecting at the service panel the first circuit between the first common AC line wire and the first AC neutral wire and delivering DC power from the first circuit to the first AC neutral wire. According to one embodiment, the method further includes connecting the first circuit to the first AC neutral wire within the first circuit. According to one embodiment, the method further includes connecting the first circuit to the first AC neutral wire outside the first circuit.

According to one embodiment, the first one of the multitude of existing AC power distribution circuits further includes a third AC hot wire. The third AC hot wire is connected between the first socket and a fourth circuit breaker. The third AC hot wire is connected through the fourth circuit breaker to the second common AC line wire. The fourth circuit breaker is dispositioned at the service panel. The first common AC line wire is one hundred and eighty degrees out of phase with the second common AC line wire. The method further includes forming the first circuit by integrating and connecting a fifth circuit breaker in series with the converter circuit, replacing the fourth circuit breaker with the first circuit, and electrically connecting the first circuit between the second common AC line wire and the third AC hot wire at the service panel. The method further includes converting AC power provided from the first common AC line wire and the second common AC line wire to DC power using the converter circuit, and delivering DC power from the first circuit to the third AC hot wire and the first socket.

According to one embodiment, the method further includes connecting the first circuit to the third AC hot wire within the first circuit. According to one embodiment, the method further includes connecting the first circuit to the third AC hot wire outside the first circuit.

According to one embodiment of the present invention, a method for delivering DC power to an existing outlet in a building is presented. The method includes converting an AC voltage provided from an AC power source to a DC voltage by replacing a first circuit breaker already disposed in a service panel of the building with a second circuit breaker thereby delivering DC power to the existing outlet.

According to one embodiment of the present invention, an electrical apparatus for delivering DC power to an existing outlet in a building is presented. The electrical apparatus includes a first circuit breaker configured to convert an AC voltage provided from an AC power source to a DC voltage, replace a second circuit breaker already disposed in a service panel of the building with the first circuit breaker, and deliver DC power to the existing outlet, when the first circuit breaker is installed at the service panel.

According to one embodiment of the present invention, an electrical apparatus for delivering DC power to one of a multitude of existing AC power distribution circuits in a building is presented. A first one of the multitude of existing AC power distribution circuits includes a first AC hot wire and a first socket. A second one of the multitude of existing AC power distribution circuits includes a second AC hot wire and a second socket. The first AC hot wire is connected between the first socket and a first circuit breaker. The second AC hot wire is connected between the second socket and a second circuit breaker. The first AC hot wire is connected through the first circuit breaker to a first common AC line wire. The second AC hot wire is connected through the second circuit breaker to a second common AC line wire. The first common AC line wire and the second common AC line wire are coupled to an AC power source that supplies AC power to the building. The first common AC line wire, the second common AC line wire, the first circuit breaker, and the second circuit breaker are dispositioned at a service panel in the building, the electrical apparatus includes a first circuit including a third circuit breaker integrated and connected in series with a converter circuit. The converter circuit is configured to convert AC power to DC power. The first circuit is adapted to replace the first circuit breaker with the first circuit, and electrically connect the first circuit between the first common AC line wire and the first AC hot wire at the service panel. The first circuit is further adapted to convert AC power provided from the first common AC line wire to DC power using the converter circuit, and deliver DC power from the first circuit to the first AC hot wire and the first socket of the first one of the multitude of existing AC power distribution circuits while keeping AC power delivery unchanged to the second one of the multitude of existing AC power distribution circuits.

According to one embodiment, the first circuit is further adapted to replace the first circuit breaker, electrically connect the first circuit, convert AC power, and deliver DC power at the service panel of the building. According to one embodiment, the first circuit is further adapted to receive AC power from the first common AC line wire and a common neutral wire. The common neutral wire is coupled to the AC power source. The common neutral wire is dispositioned at the service panel. According to one embodiment, the first circuit is further adapted to replace the first circuit with the first circuit breaker after replacing the first circuit breaker with the first circuit, and then deliver AC power from the first common AC line wire to the first AC hot wire and the first socket.

According to one embodiment, the first circuit is further adapted to connect the third circuit breaker between the first common AC line wire and the converter circuit, and automatically disconnect the converter circuit from the first common AC line wire when the amount of current flowing through the third circuit breaker exceeds a predetermined current. The first circuit is further adapted to prevent damage to the first circuit and the first one of the multitude of existing AC power distribution circuits when the converter circuit is disconnected from the first common AC line wire. According to one embodiment, the first circuit is further adapted to reconnect the converter circuit to the first common AC line wire using the third circuit breaker when the amount of current flowing is safe for reconnection.

According to one embodiment, the first one of the multitude of existing AC power distribution circuits further includes a first AC neutral wire. The first AC neutral wire is connected between the first socket and a common neutral wire dispositioned at the service panel. The first circuit is further adapted to disconnect the first AC neutral wire from the common neutral wire at the service panel when the first circuit replaces the first circuit breaker at the service panel.

According to one embodiment, the first circuit is further adapted to electrically connect at the service panel the first circuit between the first common AC line wire and the first AC neutral wire, and deliver DC power from the first circuit to the first AC neutral wire. According to one embodiment, the first circuit is further adapted to connect the first circuit to the first AC neutral wire within the first circuit. According to one embodiment, the first circuit is further adapted to connect the first circuit to the first AC neutral wire outside the first circuit.

According to one embodiment, the first one of the multitude of existing AC power distribution circuits further includes a third AC hot wire. The third AC hot wire is connected between the first socket and a fourth circuit breaker. The third AC hot wire is connected through the fourth circuit breaker to the second common AC line wire. The fourth circuit breaker is dispositioned at the service panel. The first common AC line wire is one hundred and eighty degrees out of phase with the second common AC line wire. The first circuit further includes a fifth circuit breaker integrated and connected in series with the converter circuit. The first circuit is further adapted to replace the fourth circuit breaker with the first circuit, and electrically connect the first circuit between the second common AC line wire and the third AC hot wire at the service panel. The first circuit is further adapted to convert AC power provided from the first common AC line wire and the second common AC line wire to DC power using the converter circuit, and deliver DC power from the first circuit to the third AC hot wire and the first socket.

According to one embodiment, the first circuit is further adapted to connect the first circuit to the third AC hot wire within the first circuit. According to one embodiment, the first circuit is further adapted to connect the first circuit to the third AC hot wire outside the first circuit.

A better understanding of the nature and advantages of the embodiments of the present invention may be gained with reference to the following detailed description and the accompanying drawings.

DETAILED DESCRIPTION

Figure 1:
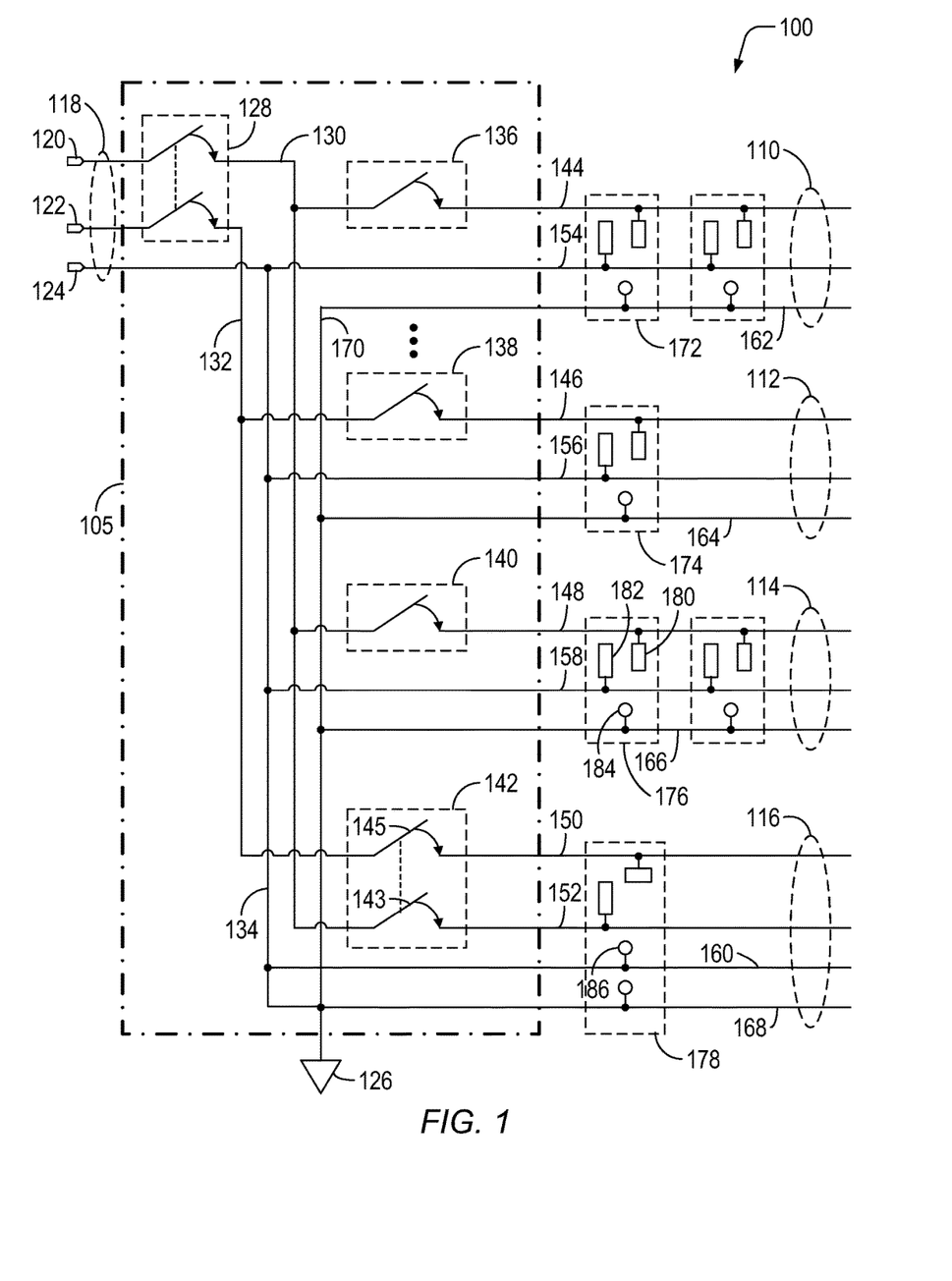
FIG. 1 depicts a simplified exemplary schematic of a service panel and a multitude of existing AC distribution circuits that may be used with embodiments of the present invention.

FIG. 1 depicts a simplified exemplary schematic 100 of a service panel 105 and a multitude of existing AC power distribution circuits 110, 112, 114, 116 that may be used with embodiments of the present invention. The electrical power distribution system to a house or a building is typically based on alternating current (AC). AC power supplied from an AC power source (not depicted) is coupled from an AC power input 118 to enter the house or building through inputs of service panel 105. AC power is then distributed from service panel 105 to the multitude of existing AC power distribution circuits 110, 112, 114, 116 throughout the house or building. Sometimes, one or more sub-panels (not depicted) are connected to an output of service panel 105 to further distribute power to more wiring connections in the house or building.

In the context of the embodiments, the term "coupled" is used to describe an indirect electrical connection that may or may not include other electrical functional blocks in the connection path, which is in contrast to a direct electrical connection where one electrical element may be described as being connected to another electrical element such as by a wire or a multitude of wires with no other electrical functional blocks in the connection path.

In the United States (US), service panel 105 may provide both 120V AC and 240V AC power for local use. AC power input 118 may include two single-phase 60 Hz lines 120, 122, each carrying nominally 120V root-mean-square (RMS) AC voltage at 180 degrees out of phase to one another. AC power input 118 may further include a neutral wire 124.

Service panel 105 may include a main breaker 128, a common AC line 1 wire 130, a common AC line 2 wire 132, and a common neutral wire 134. Neutral wire 124 of AC power input 118 may be connected to common neutral wire 134, which may be connected to ground 126 near service panel 105. Main breaker 128 may be respectively connected between single-phase 60 Hz lines 120, 122 and common AC line 1 wire 130, common AC line 2 wire 132. Main breaker 128 may be configured to simultaneously connect/disconnect single-phase 60 Hz lines 120, 122 from AC power input 118. The service panel is operative to connect or disconnect the AC power source from the building using main breaker 128. Therefore, common AC line 1 wire 130, common AC line 2 wire 132, and common neutral wire 134 are coupled to the AC power source that supplies AC power to service panel 105 and the building through AC power input 118.

Existing AC power distribution circuits 110, 112, 114 may be configured to nominally distribute 120V AC power and may respectively include a single AC hot wire 144, 146, 148. Existing AC power distribution circuit 116 may be configured to nominally distribute 240V AC power and may include two AC hot wires 150, 152. Existing AC power distribution circuits 110, 112, 114, 116 may further respectively include an AC neutral wire 154, 156, 158, 160 each connected to common neutral wire 134 at service panel 105. In some countries or in older standards, ground and neutral wires may be combined into a single wire without separate wiring. Existing AC power distribution circuits 110, 112, 114, 116 may further respectively include a ground wire 162, 164, 166, 168 each connected to common ground wire 170 at service panel 105. Existing AC power distribution circuits 110, 112, 114, 116 may further respectively include one of a multitude of sockets, hereinafter also referred to as outlets, 172, 174, 176, 178 respectively.

Each one of the multitude of sockets 172, 174, 176, 178 may be disposed on the surfaces of one or more walls of the building. Each existing socket may include one slot 180 connected to an associated AC hot wire, such as for example AC hot wire 148, another slot 182 connected to an associated AC neutral wire, such as AC neutral wire 158, and a ground slot 184 connected to an associated ground wire, such as ground wire 166. Socket 178 may include a pair of slots connected respectively to two AC hot wires 150, 152 and a connection 186 to neutral wire 160.

Service panel 105 may further include a multitude of circuit breakers 136, 138, 140, 142, 143, 145 each respectively associated with a different one of the existing AC power distribution circuits 110, 112, 114, 116. Each one of the multitude of circuit breakers 136, 138, 140, 142, 143, 145 may be used to respectively gate power delivery to a different associated one of the multitude of existing AC power distribution circuits 110, 112, 114, 116. For example, AC hot wire 148 may be connected between socket 176 and circuit breaker 140. Accordingly, AC hot wire 148 may be connected through the circuit breaker 140 to common AC line 1 wire 130. Analogously, AC hot wire 146 may be connected between socket 174 and circuit breaker 138. AC hot wire 146 may be connected through the circuit breaker 138 to common AC line 2 wire 132. Circuit breakers 136, 138, 140 may be single pole circuit breakers, while circuit breaker 142 may be a double pole circuit breaker that includes circuit breakers 143, 145. Circuit breaker 142 may be connected between AC hot wires 150, 152 and common AC line 1 wire 130, common AC line 2 wire 132 respectively. Common AC line 1 wire 130, common AC line 2 wire 132, common neutral wire 134, common ground wire 170, and the multitude of circuit breakers 136, 138, 140, 142, 143, 145 may be dispositioned at service panel 105 in the home or building.

In US, neutral is not required for 240V AC circuit use and could be inactive for 240V AC in US. But it may be useful to wire the neutral at a 240V circuit in case it is needed. For example, stoves may use 240V for the heating elements but 120V for light bulbs. Neutral is used as a current return path for return current from the line or hot wires and is active for 120V AC. Neutral and ground are at zero or near zero voltage by being connected together at service panel 105 and possibly other locations.

Although the nominal voltage is 120V AC, the national standards in the United States (US) and Canada allow a range of 114V to 126V (120V±5% RMS). Historically, 110V, 115V and 117V were used at different times and places in North America as well as 120V. Occasionally, people may speak of main power as 110V in US.

Figure 2:
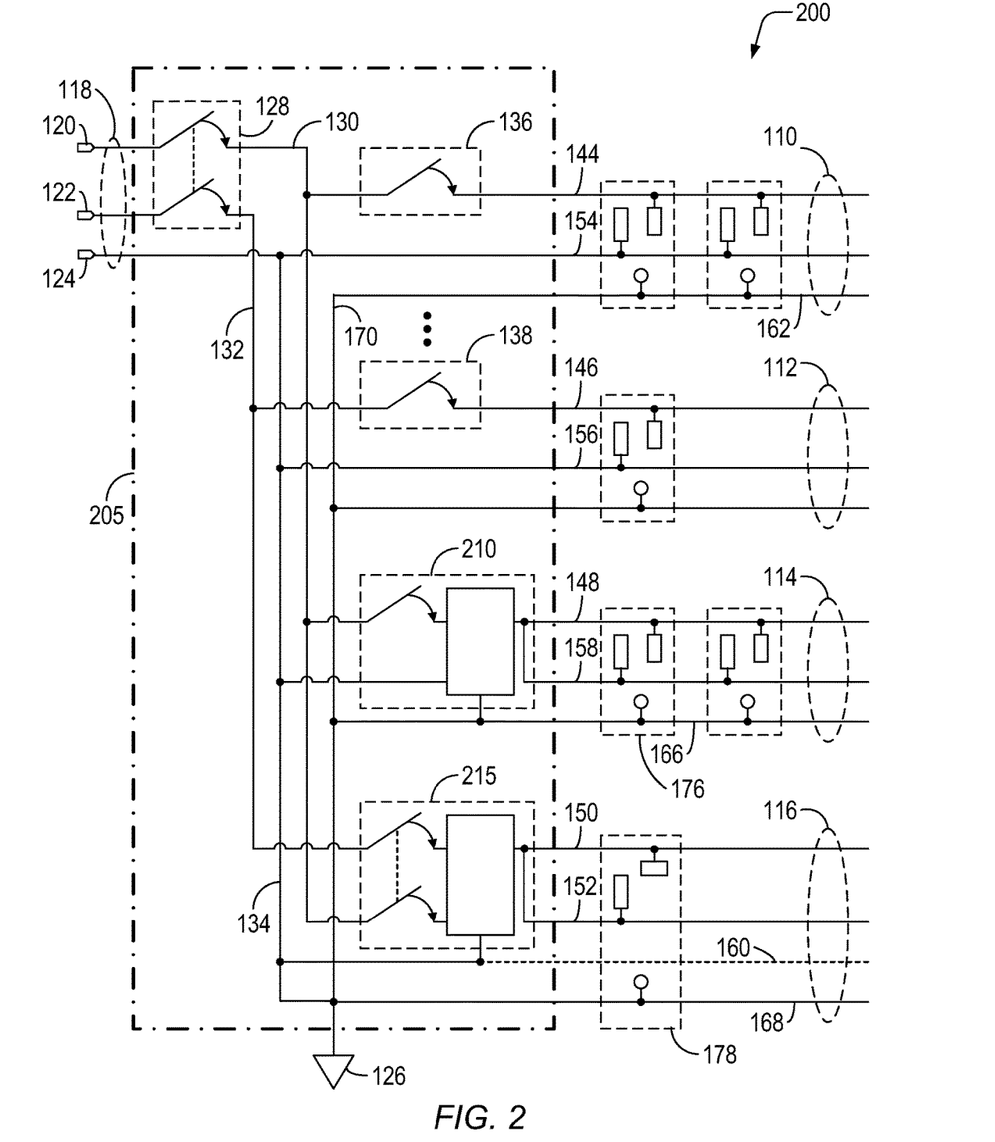
FIG. 2 depicts a simplified exemplary schematic of a service panel capable of distributing 240V AC, 120V AC, and DC power to selected ones of the multitude of existing AC distribution circuits depicted in FIG. 1, in accordance with one embodiment of the present invention.

Different from US, which uses two 180 degree out of phase hot wires for the 240V power, the 240V AC in United Kingdom (UK) may use single phase with one hot wire, one neutral, and one local ground. In the context of FIG. 2, common AC line 1 wire 130 may be the same as common AC line 2 wire 132 or connected together in the UK. Local ground is the connection to ground at the service panel or sub-panel location. Neutral is also an active current return path here. In Europe, the electrical power specifications are nominal 230V RMS AC with −10%+6% at 50 Hz. Although only specific voltages are referred in the description, the apparatus and embodiments are applicable to all voltage ranges and variations within the standard specifications and beyond.

A majority of electronic devices use DC power to operate. For DC devices to run on AC power, external power adaptors are often required to convert the AC power into DC voltage, e.g. 5V. As more electronic devices are shipped, larger numbers of power adaptors would be dispersed. It is useful to minimize the use of AC power adaptor as much as possible to bring convenience to life, to reduce energy waste at every power conversion, and to eliminate substantial e-waste from power adaptors.

Embodiments of the present invention leverage the existing legacy electrical wiring infrastructure for DC power distribution. The embodiments enable the delivery of DC power on the same existing wiring infrastructure and enable the co-existence of both AC and DC power distribution at the house or building.

FIG. 2 depicts a simplified exemplary schematic 200 of a service panel 205 capable of distributing 240V AC, 120V AC, and DC power to selected ones of the multitude of existing AC distribution circuits depicted in FIG. 1, in accordance with one embodiment of the present invention. Referring simultaneously to FIGS. 1 and 2, service panel 205 includes the same elements and functions as service panel 105 with the following exceptions. Service panel 205 includes replacing a selected existing one of the multitude of circuit breakers 136, 138, 140, 142, such as for example circuit breaker 140 and 142, with a new type of circuit breaker 210, 215 respectively. New type of circuit breaker 210, 215 converts AC power into DC power, in addition to its feature of acting as a circuit breaker. New type of circuit breaker 210 is configured to convert 120V AC power into DC power. New type of circuit breaker 215 is configured to convert 240V AC power into DC power.

Therefore, when circuit breakers 140 and 142 are replaced in service panel 105 with new type of circuit breaker 210, 215 respectively, at least one of the multitude of existing AC power distribution circuits 110, 112, 114, 116, such as respectively 114, 116 depicted in this example, are transformed into one of a multitude of DC power distribution circuits to deliver DC power to connections, outlets and/or sockets connected thereto. When new type of circuit breaker 210 is electrically connected between common AC line 1 wire 130 and AC hot wire 148, DC power may be delivered from new type of circuit breaker 210 to AC hot wire 148 and one of the multitude of sockets 176 of one of the multitude of existing AC power distribution circuits 114 without changing AC power delivery to another one of the multitude of existing AC power distribution circuits 110, 112. Simultaneously, the remaining ones of the multitude of existing AC power distribution circuits 110, 112 where new type of circuit breaker 210 is not installed may continue to still provide AC power for AC use.

One or more existing circuit breakers in service panel 105 may be selectively replaced by one or more new type of circuit breaker 210 or 215 based on the application requirements, and vice versa. In other words, the transformation from AC power distribution circuit to DC power distribution circuit is reversible by respectively replacing one of the new type of circuit breaker 210, 215 back again with the old circuit breaker 140, 142 at service panel 105. The transformation from AC power distribution circuit to DC power distribution circuit may be reversed by replacing new type of circuit breaker 210, 215 with the old circuit breaker 140, 142 after replacing the old circuit breaker 140, 142 with new type of circuit breaker 210, 215 and thereby delivering AC power from common AC line 1 wire 130 to AC hot wire 148 and socket 176.

Figure 3A:
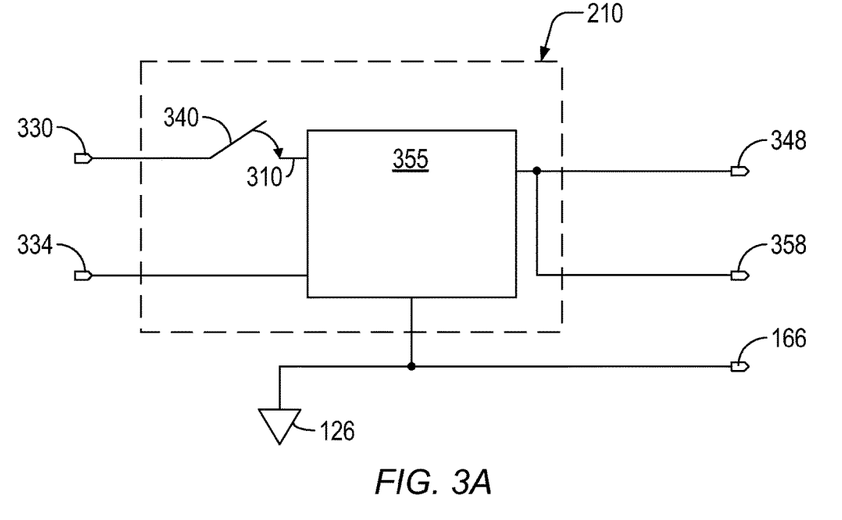
FIG. 3A depicts a simplified exemplary schematic of a new type of circuit breaker configured to convert 120V AC power from a single common AC line wire into DC power as depicted in FIG. 2, in accordance with one embodiment of the present invention.

FIG. 3A depicts a simplified exemplary schematic of new type of circuit breaker 210 configured to convert 120V AC power from a single common AC line wire into DC power as depicted in FIG. 2, in accordance with one embodiment of the present invention. New type of circuit breaker 210 includes a circuit breaker 340 and an AC to DC power converter 355 that converts 120V AC power provided from either common AC line 1 wire 130 or common AC line 2 wire 132 to DC power. Referring simultaneously to FIGS. 1, 2, and 3A, new type of circuit breaker 210 integrates circuit breaker 340 with AC to DC power converter 355 such that new type of circuit breaker 210 may replace one of the multitude of circuit breakers 136, 138, 140 in service panel 105, 205.

After forming new type of circuit breaker 210 by integrating and connecting circuit breaker 340 in series with AC to DC power converter 355, it is noted that the steps of; i) replacing one of the multitude of circuit breakers 140 with new type of circuit breaker 210, ii) electrically connecting new type of circuit breaker 210 between common AC line 1 wire 130 and AC hot wire 148 at service panel 205, iii) converting AC power provided from common AC line 1 wire 130 to DC power using AC to DC power converter 355, iv) delivering DC power from new type of circuit breaker 210 to AC hot wire 148 and socket 176 while keeping AC power delivery unchanged to another one of the multitude of existing AC power distribution circuits 110, 112, v) disconnecting AC neutral wire 158 from common neutral wire 134 at service panel 205 when new type of circuit breaker 210 replaces circuit breaker 140 at service panel 205, vi) optionally electrically connecting at service panel 205 new type of circuit breaker 210 between common AC line 1 wire 130 and AC neutral wire 158; and vii) optionally delivering DC power from new type of circuit breaker 210 to AC neutral wire 158, may be all performed at the service panel of the building making these steps easy to perform.

New type of circuit breaker 210 further includes an AC line power input 330 that may be adapted to connect to either common AC line 1 wire 130 or common AC line 2 wire 132 in service panel 205. New type of circuit breaker 210 further includes an AC neutral power input 334 that may be adapted to connect to common neutral wire 134 in service panel 205. Circuit breaker 340 may be connected between AC line power input 330 and an embedded line power input 310 to AC to DC power converter 355. Accordingly, embedded AC to DC power converter 355 may receive 120V AC power through embedded line power input 310 and circuit breaker 340 when circuit breaker 340 is closed or "on", the AC power being provided from common AC line 1 wire 130 and common neutral wire 134 when new type of circuit breaker 210 is installed in service panel 205.

Because circuit breaker 340 may be connected between common AC line 1 wire 130 and AC to DC power converter 355, AC to DC power converter 355 may be automatically disconnected from common AC line 1 wire 130 using circuit breaker 340 when the amount of current flowing through circuit breaker 340 exceeds a predetermined unsafe level of current, due for example to electrical overload or short circuit. Circuit breaker 340 may prevent damage to new type of circuit breaker 210 and one of the multitude of existing AC power distribution circuits 114 when AC to DC power converter 355 is so disconnected from common AC line 1 wire 130 as a safety feature.

Circuit breaker 340 may then be reset or turned back on without replacing circuit breaker 340 to restore power flow after any electrical overload or short circuit condition is fixed. In other words, AC to DC power converter 355 may be reconnected to common AC line 1 wire 130 using circuit breaker 340 when the amount of current flowing through circuit breaker 340 is safe to reconnect.

The AC voltage in the US between common AC line 1 wire 130 and common neutral wire 134 is 120V RMS and is 240V RMS in UK. Common neutral wire 134 also serves as an AC current return path in both the US and UK. Since ground 126 is an available connection at both service panel 205 and optional sub-panel (not shown), it is used as the ground input for AC to DC power converter 355.

New type of circuit breaker 210 further includes a DC power output 348 from AC to DC power converter 355. DC power output 348 may be adapted to connect to AC hot wire 148 in service panel 205. When one of the multitude of existing AC power distribution circuits 110, 112, 114 is converted into a DC distribution circuit by replacing one of the multitude of circuit breakers 136, 138, 140 with new type of circuit breaker 210, DC power output 348 may be connected to original AC hot wire 148 in the existing wiring infrastructure, and AC neutral wire 158 would become floating and unused. Thereby, DC power from DC power output 348 and ground from service panel 205 may be distributed across AC hot wire 148 and ground wire 166 at one of the multitude of existing AC power distribution circuits 114 and to socket 176.

In one embodiment, AC neutral wire 158 in the existing AC power distribution circuit 114 may be connected to DC power output 348 within new type of circuit breaker 210 to provide the same DC power at both AC hot wire 148 and AC neutral wire 158. In one embodiment, AC neutral wire 158 may be connected to DC power output 348 outside new type of circuit breaker 210 but within service panel 205. In one embodiment, the DC voltage at DC power output 348 of AC to DC power converter 355 may be adjusted to meet the needs for various DC applications, such as for example 5V for USB devices, 12V, 24V, or higher for battery charging, as so on.

AC to DC power converter 355 may be transformer based or without transformer (namely transformer-less) in the converter design. The transformer may step down received AC power for further rectifying and filtering into DC power. The transformer-less design for AC to DC power converter 355 may use solid state electronics to step down the AC voltage and perform the conversion into DC voltage.

When a 120V AC device, typically connected across AC hot wire 148 and AC neutral wire 158, is accidentally plugged into socket 176 of one of the multitude of existing AC power distribution circuits 114 that has been converted to DC power distribution using the above embodiments, then either the AC neutral wire 158 is floating or the AC hot wire 148 and AC neutral wire 158 are at equal potential, so as not to cause damage to the AC device in either example.

Figure 3B:
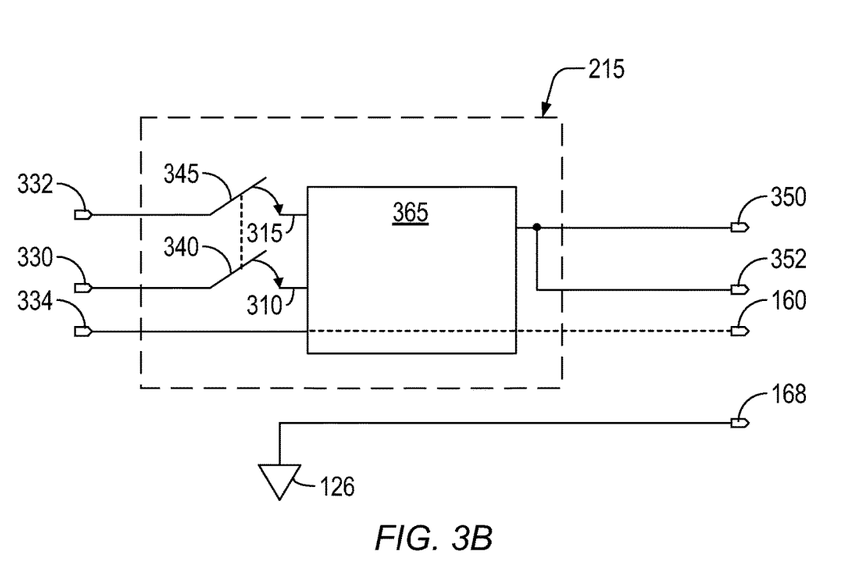
FIG. 3B depicts a simplified exemplary schematic of a new type of circuit breaker configured to convert 240V AC power from a pair of common AC line wires into DC power as depicted in FIG. 2, in accordance with one embodiment of the present invention.

FIG. 3B depicts a simplified exemplary schematic of a new type of circuit breaker 215 configured to convert 240V AC power from a pair of common AC line wires into DC power as depicted in FIG. 2, in accordance with one embodiment of the present invention. Referring simultaneously to FIGS. 1, 2, 3A, and 3B new type of circuit breaker 215 includes the same elements and functions as new type of circuit breaker 210 with the following exceptions. New type of circuit breaker 215 further includes a circuit breaker 345 and an AC to DC power converter 365 that converts 240V AC power provided from both common AC line 1 wire 130 and common AC line 2 wire 132 to DC power.

New type of circuit breaker 215 further includes an AC line power input 332 that may be adapted to connect to common AC line 2 wire 132 in service panel 205. Circuit breaker 345 may be connected between AC line power input 332 and an embedded line power input 315 to AC to DC power converter 365. Accordingly, embedded AC to DC power converter 365 may receive 240V AC power through embedded line power input 310 and circuit breaker 340 and through embedded line power input 315 and circuit breaker 345 when circuit breaker 340 and circuit breaker 345 are closed or "on", with AC power being provided across common AC line 1 wire 130 and common AC line 2 wire 132. The common neutral wire 134 may be connected as ground input 334 when new type of circuit breaker 215 is installed in service panel 205. In one embodiment, AC neutral power input 334 may be connected to new type of circuit breaker 215 to provide grounding. Ground wire 168 may be an optional local ground connection in existing AC power distribution circuit 116

New type of circuit breaker 215 may further include a DC power output from AC to DC power converter 365. When existing AC power distribution circuit 116 is converted into a DC distribution circuit by replacing circuit breaker 142 with new type of circuit breaker 215, DC power may be connected to two AC hot wires 150, 152 in existing AC power distribution circuit 116. The DC power connection to two AC hot wires 150, 152 with DC power output 350, 352 may be respectively done within new type of circuit breaker 215 or alternatively, may be done outside new type of circuit breaker 215 but within service panel 205.

Recall, one of the multitude of existing AC power distribution circuits 116 includes AC hot wires 150, 152. AC hot wire 150 is connected between socket 178 and a circuit breaker 145. AC hot wire 152 is connected between socket 178 and a circuit breaker 143. AC hot wire 150 is connected through circuit breaker 145 to common AC line 2 wire 132.

AC hot wire 152 is connected through circuit breaker 143 to common AC line 1 wire 130. Common AC line 1 wire 130, common AC line 2 wire 132, circuit breaker 143, and circuit breaker 145 are dispositioned at service panel 105. Common AC line 1 wire 130 and common AC line 2 wire 132 are coupled to the AC power source. Common AC line 1 wire 130 is one hundred and eighty degrees out of phase with common AC line 2 wire 132.

The original AC neutral wire 160 in existing AC power distribution circuit 116 may be unconnected or floating after replacing circuit breaker 142 with new type of circuit breaker 365 if local ground wire 168 from service panel 205 is available, or common neutral wire 334 may be used as ground connective for AC to DC power converter 365 if the local ground wire 168 is not available. Thereby, DC power from DC power output 350, 352 and ground from ground wire 168 and/or neutral wire 160 may be distributed across the original two AC hot wires 150, 152, neutral wire 160 and/or ground wire 168 at one of the multitude of existing AC power distribution circuit 116 and to socket 178.

After forming new type of circuit breaker 215 by integrating and connecting circuit breaker 340 in series with AC to DC power converter 365 and by integrating and connecting circuit breaker 345 in series with AC to DC power converter 365, it is noted that the steps of; i) replacing one of the multitude of circuit breakers 142 with new type of circuit breaker 215, ii) electrically connecting new type of circuit breaker 215 between common AC line 1 wire 130 and between AC hot wire 150 and between common AC line 2 wire 132 and AC hot wire 152 at service panel 205, iii) converting AC power provided from common AC line 1 wire 130 and common AC line 2 wire 132 to DC power using AC to DC power converter 365, iv) delivering DC power from new type of circuit breaker 215 to AC hot wire 150, AC hot wire 152, and socket 176, while keeping AC power delivery unchanged to another one of the multitude of existing AC power distribution circuits 110, 112, v) optionally disconnecting AC neutral wire 160 from common neutral wire 134 at service panel 205 when new type of circuit breaker 215 replaces circuit breaker 142 at service panel 205, vi) optionally connecting new type of circuit breaker 215 to AC hot wire 152 within new type of circuit breaker 215, and/or vii) connecting new type of circuit breaker 215 to AC hot wire 152 outside new type of circuit breaker 215, may be all performed at the service panel of the building making these steps easy to perform.

The selective installation of new type of circuit breaker 210, 215 in service panel 205 may selectively transform existing AC power distribution circuits 110, 112, 114, 116 into DC power distribution circuits for DC power delivery over the legacy AC wiring infrastructure without changing any wiring outside service panel 205, i.e. without changing the wiring in existing AC power distribution circuits 110, 112, 114, 116 and without changing the associated wall sockets. Therefore, separate AC to DC power adaptors for obtaining DC power to operate DC electronic devices are no longer needed at each socket or power strip, thereby reducing e-waste. Further, the installation of new type of circuit breaker 210, 215 in service panel 205 may be done to transform selected ones of existing AC power distribution circuits 114, 116 into DC power distribution circuits while unselected ones of existing AC power distribution circuits 110, 112 remain unchanged, thereby providing both AC and DC power delivery from the same service panel 205.

The above embodiments of the present invention are illustrative and not limiting. Various alternatives and equivalents are possible. Although, the invention has been described with reference to exemplary AC voltage levels by way of an example, it is understood that the invention is not limited by the AC voltage level but may also be applicable to any AC voltage level. Although, the invention has been described with reference to exemplary DC voltage levels by way of an example, it is understood that the invention is not limited by the DC voltage level but may also be applicable to any DC voltage level. Although, the invention has been described with reference to an exemplary wall socket by way of an example, it is understood that the invention is not limited by the type of wall socket. Although, the invention has been described with reference to an exemplary service panel by way of an example, it is understood that the invention is not limited by the type of service panel or sub-panel, so long as circuit breakers are included in the service panel or sub-panel. The scope of the invention should, therefore, be determined not with reference to the above description, but instead should be determined with reference to the pending claims along with their full scope or equivalents.

What is claimed is:

1. A method to deliver DC power to one of a plurality of existing AC power distribution circuits in a building, wherein a first one of the plurality of existing AC power distribution circuits includes a first AC hot wire and a first socket, wherein a second one of the plurality of existing AC power distribution circuits includes a second AC hot wire and a second socket, wherein the first AC hot wire is connected between the first socket and a first circuit breaker, wherein the second AC hot wire is connected between the second socket and a second circuit breaker, wherein the first AC hot wire is connected through the first circuit breaker to a first common AC line wire, wherein the second AC hot wire is connected through the second circuit breaker to a second common AC line wire, wherein the first common AC line wire and the second common AC line wire are coupled to an AC power source that supplies AC power to the building, wherein the first common AC line wire, the second common AC line wire, the first circuit breaker, and the second circuit breaker are dispositioned at a service panel in the building, the method comprising:

forming a first circuit by integrating and connecting a third circuit breaker in series with a converter circuit, wherein the converter circuit converts AC power to DC power;

replacing the first circuit breaker with the first circuit;

electrically connecting the first circuit between the first common AC line wire and the first AC hot wire at the service panel;

converting AC power provided from the first common AC line wire to DC power using the converter circuit; and delivering DC power from the first circuit to the first AC hot wire and the first socket of the first one of the plurality of existing AC power distribution circuits while keeping AC power delivery unchanged to the second one of the plurality of existing AC power distribution circuits.

2. The method of claim 1, wherein the first common AC line wire is the same as the second common AC line wire.

3. The method of claim 1, wherein the AC power source supplies AC power to the service panel and the building.

4. The method of claim 1, wherein the service panel is operative to disconnect the AC power source from the building.

5. The method of claim 1, wherein the first socket is disposed on the surface of a wall of the building.

6. The method of claim 1, wherein the steps of replacing the first circuit breaker, electrically connecting the first circuit, converting AC power, and delivering DC power are performed at the service panel of the building.

7. The method of claim 1 further comprising:
receiving AC power from the first common AC line wire and a common neutral wire, wherein the common neutral wire is coupled to the AC power source, wherein the common neutral wire is dispositioned at the service panel.

8. The method of claim 1 further comprising:
replacing the first circuit with the first circuit breaker after replacing the first circuit breaker with the first circuit; and
then delivering AC power from the first common AC line wire to the first AC hot wire and the first socket.

9. The method of claim 1 further comprising:
connecting the third circuit breaker between the first common AC line wire and the converter circuit;
automatically disconnecting the converter circuit from the first common AC line wire when the amount of current flowing through the third circuit breaker exceeds a predetermined current; and
preventing damage to the first circuit and the first one of the plurality of existing AC power distribution circuits when the converter circuit is disconnected from the first common AC line wire.

10. The method of claim 9 further comprising:
reconnecting the converter circuit to the first common AC line wire using the third circuit breaker when the amount of current flowing is safe for reconnection.

11. The method of claim 1, wherein the first one of the plurality of existing AC power distribution circuits further includes a first AC neutral wire, wherein the first AC neutral wire is connected between the first socket and a common neutral wire dispositioned at the service panel, the method further comprising:
disconnecting the first AC neutral wire from the common neutral wire at the service panel when the first circuit replaces the first circuit breaker at the service panel.

12. The method of claim 11 further comprising:
electrically connecting at the service panel the first circuit between the first common AC line wire and the first AC neutral wire; and
delivering DC power from the first circuit to the first AC neutral wire.

13. The method of claim 12 further comprising:
connecting the first circuit to the first AC neutral wire within the first circuit.

14. The method of claim 12 further comprising:
connecting the first circuit to the first AC neutral wire outside the first circuit.

15. The method of claim 1, wherein the first one of the plurality of existing AC power distribution circuits further includes a third AC hot wire, wherein the third AC hot wire is connected between the first socket and a fourth circuit breaker, wherein the third AC hot wire is connected through the fourth circuit breaker to the second common AC line wire, wherein the fourth circuit breaker is dispositioned at the service panel, wherein the first common AC line wire is one hundred and eighty degrees out of phase with the second common AC line wire, the method further comprising:
forming the first circuit by integrating and connecting a fifth circuit breaker in series with the converter circuit;
replacing the fourth circuit breaker with the first circuit;
electrically connecting the first circuit between the second common AC line wire and the third AC hot wire at the service panel;
converting AC power provided from the first common AC line wire and the second common AC line wire to DC power using the converter circuit;
delivering DC power from the first circuit to the third AC hot wire and the first socket.

16. The method of claim 15 further comprising:
connecting the first circuit to the third AC hot wire within the first circuit.

17. The method of claim 15 further comprising:
connecting the first circuit to the third AC hot wire outside the first circuit.

18. A method for delivering DC power to an existing outlet in a building, the method comprising:
converting an AC voltage provided from an AC power source to a DC voltage by replacing a first circuit breaker already disposed in a service panel of the building with a second circuit breaker thereby delivering DC power to the existing outlet.

19. An electrical apparatus for delivering DC power to an existing outlet in a building, the electrical apparatus comprising:
a first circuit breaker configured to:
convert an AC voltage provided from an AC power source to a DC voltage;
replace a second circuit breaker already disposed in a service panel of the building with the first circuit breaker; and
deliver DC power to the existing outlet, when the first circuit breaker is installed at the service panel.

20. An electrical apparatus for delivering DC power to one of a plurality of existing AC power distribution circuits in a building, wherein a first one of the plurality of existing AC power distribution circuits includes a first AC hot wire and a first socket, wherein a second one of the plurality of existing AC power distribution circuits includes a second AC hot wire and a second socket, wherein the first AC hot wire is connected between the first socket and a first circuit breaker, wherein the second AC hot wire is connected between the second socket and a second circuit breaker, wherein the first AC hot wire is connected through the first circuit breaker to a first common AC line wire, wherein the second AC hot wire is connected through the second circuit breaker to a second common AC line wire, wherein the first common AC line wire and the second common AC line wire are coupled to an AC power source that supplies AC power to the building, wherein the first common AC line wire, the second common AC line wire, the first circuit breaker, and the second circuit breaker are dispositioned at a service panel in the building, the electrical apparatus comprising:
a first circuit including a third circuit breaker integrated and connected in series with a converter circuit, wherein the converter circuit is configured to convert AC power to DC power; and
the first circuit being adapted to:
replace the first circuit breaker with the first circuit;
electrically connect the first circuit between the first common AC line wire and the first AC hot wire at the service panel;
convert AC power provided from the first common AC line wire to DC power using the converter circuit; and
deliver DC power from the first circuit to the first AC hot wire and the first socket of the first one of the plurality of existing AC power distribution circuits while keeping AC power delivery unchanged to the second one of the plurality of existing AC power distribution circuits.

21. The method of claim 20, wherein the first common AC line wire is the same as the second common AC line wire.

22. The electrical apparatus of claim 20, wherein the AC power source supplies AC power to the service panel and the building.

23. The electrical apparatus of claim 20, wherein the service panel is adapted to disconnect the AC power source from the building.

24. The electrical apparatus of claim 20, wherein the first socket is disposed on the surface of a wall of the building.

25. The electrical apparatus of claim 20, wherein the first circuit is further adapted to replace the first circuit breaker, electrically connect the first circuit, convert AC power, and deliver DC power at the service panel of the building.

26. The electrical apparatus of claim 20, wherein the first circuit is further adapted to:
receive AC power from the first common AC line wire and a common neutral wire, wherein the common neutral wire is coupled to the AC power source, wherein the common neutral wire is dispositioned at the service panel.

27. The electrical apparatus of claim 20, wherein the first circuit is further adapted to:
replace the first circuit with the first circuit breaker after replacing the first circuit breaker with the first circuit; and
then deliver AC power from the first common AC line wire to the first AC hot wire and the first socket.

28. The electrical apparatus of claim 20, wherein the first circuit is further adapted to:
connect the third circuit breaker between the first common AC line wire and the converter circuit;
automatically disconnect the converter circuit from the first common AC line wire when the amount of current flowing through the third circuit breaker exceeds a predetermined current; and
prevent damage to the first circuit and the first one of the plurality of existing AC power distribution circuits when the converter circuit is disconnected from the first common AC line wire.

29. The electrical apparatus of claim 28, wherein the first circuit is further adapted to:
reconnect the converter circuit to the first common AC line wire using the third circuit breaker when the amount of current flowing is safe for reconnection.

30. The electrical apparatus of claim 20, wherein the first one of the plurality of existing AC power distribution circuits further includes a first AC neutral wire, wherein the first AC neutral wire is connected between the first socket and a common neutral wire dispositioned at the service panel, wherein the first circuit is further adapted to:
disconnect the first AC neutral wire from the common neutral wire at the service panel when the first circuit replaces the first circuit breaker at the service panel.

31. The electrical apparatus of claim 30, wherein the first circuit is further adapted to:
electrically connect at the service panel the first circuit between the first common AC line wire and the first AC neutral wire; and
deliver DC power from the first circuit to the first AC neutral wire.

32. The electrical apparatus of claim 31, wherein the first circuit is further adapted to:
connect the first circuit to the first AC neutral wire within the first circuit.

33. The electrical apparatus of claim 31, wherein the first circuit is further adapted to:
connect the first circuit to the first AC neutral wire outside the first circuit.

34. The electrical apparatus of claim 20, wherein the first one of the plurality of existing AC power distribution circuits further includes a third AC hot wire, wherein the third AC hot wire is connected between the first socket and a fourth circuit breaker, wherein the third AC hot wire is connected through the fourth circuit breaker to the second common AC line wire, wherein the fourth circuit breaker is dispositioned at the service panel, wherein the first common AC line wire is one hundred and eighty degrees out of phase with the second common AC line wire, wherein the first circuit further includes a fifth circuit breaker integrated and connected in series with the converter circuit, wherein the first circuit is further adapted to:
replace the fourth circuit breaker with the first circuit;
electrically connect the first circuit between the second common AC line wire and the third AC hot wire at the service panel;
convert AC power provided from the first common AC line wire and the second common AC line wire to DC power using the converter circuit; and
deliver DC power from the first circuit to the third AC hot wire and the first socket.

35. The electrical apparatus of claim 34, wherein the first circuit is further adapted to:
connect the first circuit to the third AC hot wire within the first circuit.

36. The electrical apparatus of claim 34, wherein the first circuit is further adapted to:
connect the first circuit to the third AC hot wire outside the first circuit.

* * * * *